United States Patent
Krylov et al.

(10) Patent No.: US 10,902,118 B2
(45) Date of Patent: Jan. 26, 2021

(54) SYSTEM AND METHOD OF TRAINING A MACHINE LEARNING MODEL FOR DETECTION OF MALICIOUS CONTAINERS

(71) Applicant: AO Kaspersky Lab, Moscow (RU)

(72) Inventors: Vladimir V. Krylov, Moscow (RU); Alexander V. Liskin, Moscow (RU); Alexey E. Antonov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 225 days.

(21) Appl. No.: 16/124,255

(22) Filed: Sep. 7, 2018

(65) Prior Publication Data

US 2019/0243972 A1 Aug. 8, 2019

(30) Foreign Application Priority Data

Feb. 6, 2018 (RU) ................................ 2018104438

(51) Int. Cl.
  *G06F 21/00* (2013.01)
  *G06F 21/56* (2013.01)
  *G06N 20/00* (2019.01)

(52) U.S. Cl.
  CPC .......... *G06F 21/564* (2013.01); *G06F 21/561* (2013.01); *G06N 20/00* (2019.01); *G06F 2221/033* (2013.01)

(58) Field of Classification Search
  CPC ................. G06F 21/564; G06F 21/561; G06F 2221/033; G06N 20/00
  See application file for complete search history.

(56) References Cited

U.S. PATENT DOCUMENTS

| | | | |
|---|---|---|---|
| 8,838,992 B1 | 9/2014 | Zhu et al. | |
| 8,875,286 B2 * | 10/2014 | Friedrichs | H04L 63/1416 713/189 |
| 9,690,938 B1 * | 6/2017 | Saxe | G06F 21/563 |
| 10,726,124 B2 * | 7/2020 | Tien | G06F 21/566 |
| 2013/0222422 A1 | 8/2013 | Fang | |
| 2017/0017793 A1 | 1/2017 | Davis et al. | |
| 2017/0372071 A1 | 12/2017 | Saxe | |

(Continued)

FOREIGN PATENT DOCUMENTS

| | | |
|---|---|---|
| JP | 2017004123 A | 1/2017 |
| WO | 2018045165 A1 | 3/2018 |

OTHER PUBLICATIONS

European Search Report, EP 18204711. Feb. 1, 2019. (Year: 2019).*
Japanese Search Report, JP 2018210452. May 25, 2020. (Year: 2020).*

*Primary Examiner* — Sarah Su
(74) *Attorney, Agent, or Firm* — Arent Fox LLP; Michael Fainberg

(57) ABSTRACT

Disclosed are systems and methods for training and retraining a model for detection of malicious activity from container files, which contain at least two or more objects constituting logically separate data regions. Parameters of each object chosen from at least one safe container and one malicious container are determined which uniquely characterize the functional relation of the mentioned object to at least one selected object. Convolutions are formed separately for each container on the basis of the determined parameters of the objects, which are used to train a machine learning model for detecting malicious container files.

20 Claims, 5 Drawing Sheets

(56) References Cited

U.S. PATENT DOCUMENTS

2018/0060580 A1* 3/2018 Zhao ................. G06F 21/56
2018/0063169 A1* 3/2018 Zhao ................. G06N 3/0454
2018/0189484 A1* 7/2018 Danahy ............. G06F 21/566
2019/0171811 A1* 6/2019 Daniel .............. G06N 20/00
2020/0057854 A1* 2/2020 Wojnowicz ........ G06N 7/005

* cited by examiner

SYSTEM AND METHOD OF TRAINING A MACHINE LEARNING MODEL FOR DETECTION OF MALICIOUS CONTAINERS

CROSS-REFERENCE TO RELATED APPLICATIONS

This application claims benefit of priority under 35 U.S.C. 119(a)-(d) to a Russian Patent Application No. 2018104438 filed on Feb. 6, 2018, which is incorporated by reference herein.

FIELD OF TECHNOLOGY

The present disclosure relates to antivirus technologies and, more specifically, to systems and methods of training and teaching machine learning models for detecting malicious containers.

BACKGROUND

The rapid development of computer technologies in the recent decade, as well as the widespread use of various computing devices (personal computers, notebooks, tablets, smartphones, etc.), have become a powerful incentive to the use of these devices in various areas of activity and to solve a huge number of problems (from Internet surfing to bank transfers and electronic documentation). In parallel with the growth in the number of computing devices and software running on these devices, the number of malicious programs has also grown at a rapid pace.

At present, a huge number of kinds of malicious programs exist. Some of them steal personal and confidential information about users from the devices of said users (such as logins and passwords, banking information, electronic documents). Others turn the devices of users into so-called botnets for attacks such as distributed denial of service (DDoS) attacks, or to sort through passwords by the brute force method on other computers or computer networks. Still others propose paid content to users through intrusive advertising, paid subscriptions, sending of SMS to toll numbers, and so on.

Specialized programs, or antivirus applications, are used to deal with malicious programs, including the detecting of malicious programs, the preventing of infection and the restoring of computer systems infected with malicious programs. Antivirus programs employ diverse technologies to detect a whole array of malicious programs, such as static analysis and dynamic analysis. Static analysis refers to the analysis of a program for harmfulness, excluding launching or emulation of the working of the program being analyzed, on the basis of data contained in files making up the program being analyzed, during which statistical analysis may employ (i) signature analysis, i.e., searching for correspondences of a particular code section of a program being analyzed to a known code (signature) from a database of signatures of malicious programs; and (ii) white and black lists, i.e., searching for a computed check sum from a program being analyzed (or portions thereof) in a database of check sums of malicious programs (black lists) or a database of check sums of secure programs (white lists). Dynamic analysis refers to the analysis of a program for harmfulness on the basis of data obtained in the course of execution or emulation of the working of the program being analyzed, during which dynamic analysis may employ (i) heuristic analysis, i.e., emulation of the working of the program being analyzed, creating emulation logs (containing data on the API function calls, the parameters transmitted, the code sections of the program being analyzed, and so on), and searching for correspondences of the data from the logs so created with data from a database of emulated signatures of malicious programs; and (ii) proactive protection, i.e., intercepting of API function calls of a launched program being analyzed, creating of logs on the working of the program being analyzed (containing data on the API function calls, the parameters transmitted, the code sections of the program being analyzed, and so on), and searching for correspondences of the data from the logs so created with data from a database of calls of malicious programs.

Both static and dynamic analysis have their advantages and disadvantages. Static analysis is less demanding on the resources of the computer system on which the analysis is being done, and since it does not require the execution or emulation of the program being analyzed, statistical analysis is faster, but less effective, i.e., it has a lower percentage of detection of malicious programs and a higher percentage of false alarms (i.e., judging a file being analyzed by the antivirus program resources as being harmful, whereas the file being analyzed is safe). Dynamic analysis, because it uses data obtained during execution or emulation of the working of the program being analyzed, is slower and places greater demands on the resources of the computer system on which the analysis is being done, but it is also more effective. Modern antivirus programs employ complex analysis, including elements of both static and dynamic analysis.

The chief problem of antivirus scanning thus far remains the task of distributing the computing resources to perform the aforementioned scanning among the programs being analyzed. Given a large stream of programs being analyzed and limited computing resources, the following is at least possible: (i) a general lowering of the quality of the antivirus scan of the programs being analyzed (for example, the use of static analysis alone, excluding dynamic analysis); (ii) arbitrary excluding from the antivirus scan of a portion of the programs being analyzed, among which might be malicious ones (for example, the queue of programs awaiting an antivirus scan amounts to N, while the computing resources are only sufficient to perform an antivirus scan of M<N programs, so that the last N–M programs will be excluded from the antivirus scan); (iii) if the average quality of the antivirus scan is maintained for the programs being analyzed, a high quality for the scanning of safe programs and a low quality for the scanning of malicious programs (for example, the safe programs are analyzed by static and dynamic analysis, the malicious ones only by static analysis); and so forth, which in turn results in mistakes of the first and second kind.

Although the known detection techniques are good at detecting malicious scripts of a given type (scripts containing predetermined, known objects), they cannot handle the detection of malicious objects of unknown types (such as those types of scripts for which no teaching has been done, such as ActionScript). Furthermore, the known techniques cannot be used for rapid analysis of a large number of files (scripts) given limited access to computing resources, since in order to commence an analysis with the use of a trained model for detection, it is necessary at first to process the script being analyzed (up to its performance, i.e., the performing of the dynamic analysis), which is a resource-hungry operation.

SUMMARY

Aspects of the present disclosure makes it possible to solve the problem of detecting malicious files with the use of elements of statistical analysis. Thus, a system and method is disclosed herein for detecting malicious file(s), and, more particularly, for techniques for training (and retraining) a machine learning model for detecting malicious container files.

According to one aspect of the present disclosure, a computer-implemented method for training a machine learning model for detecting malicious container files is provided. The method includes selecting a plurality of objects from a malicious container file, wherein a container file is a file that contains at least two or more objects constituting logically separate data regions of the container file. The method further includes determining at least one parameter for each object selected from the malicious container file. The at least one parameter characterizes a functional relation of the respective object to at least one other object in the container file. The method includes generating a first convolution associated with the malicious container file based on the determined at least one parameter. The first convolution comprises a multidimensional vector in which each element of the multidimensional vector corresponds to its own unique parameter among the determined parameters, while the value of the mentioned element corresponds to the number of objects for which the mentioned parameter has been determined. The method includes generating a second convolution associated with a safe container file based on determined parameters of objects that are chosen from the safe container file, and modifying a machine learning model based on the first convolution associated with the malicious container file and the second convolution associated with the safe container file. The machine learning model is configured to compute a degree of harmfulness of a container file under analysis.

In another aspect, the method further includes applying the machine learning model to a target container file to compute the degree of harmfulness of the target container file, wherein the computed degree of harmfulness of the target container file is a numerical value characterizing a probability that the target container file under analysis is malicious.

In another aspect, the method further includes, responsive to determining the computed degree of harmfulness is in a predetermined range of threshold values, retraining the machine learning model such that the degree of harmfulness as calculated with the retrained model is higher than the degree of harmfulness as calculated with the original machine learning model.

In another aspect, the method further includes scheduling an antivirus application to perform an antivirus scan of the target container file based on the computed degree of harmfulness.

In another aspect, the malicious container file is one of a PDF (Portable Document Format) document, a software distro, and a file archive.

In another aspect, the object selected from the container file is at least one of an executable file, a script, media data, and another container file.

In another aspect, the determined parameters of at least one selected object comprise at least one of a type of the selected object, a size of the selected object, and an index of the selected object among all the objects contained in the container file.

In another aspect, the determining at least one parameter for each object selected from the malicious container file is performed using a second machine learning model, wherein the second machine learning model comprises a set of rules for determining the parameters of the objects such that each determined parameter increases a probability of classifying a target container file as malicious.

In another exemplary aspect, a system for training a machine learning model for detecting malicious container files is provided. The system includes a storage device configured to store a group of container files, and a hardware processor. The processor is configured to select a plurality of objects from a malicious container file, and determine at least one parameter for each object selected from the malicious container file. A container file is a file that contains at least two or more objects constituting logically separate data regions of the container file, and the at least one parameter characterizes a functional relation of the respective object to at least one other object in the container file. The processor is further configured to generate a first convolution associated with the malicious container file based on the determined at least one parameter, wherein the first convolution comprises a multidimensional vector in which each element of the multidimensional vector corresponds to its own unique parameter among the determined parameters, while the value of the mentioned element corresponds to the number of objects for which the mentioned parameter has been determined, and generate a second convolution associated with a safe container file based on determined parameters of objects that are chosen from the safe container file. The processor is further configured to modify a machine learning model based on the first convolution associated with the malicious container file and the second convolution associated with the safe container file, wherein the machine learning model is configured to compute a degree of harmfulness of a container file under analysis.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
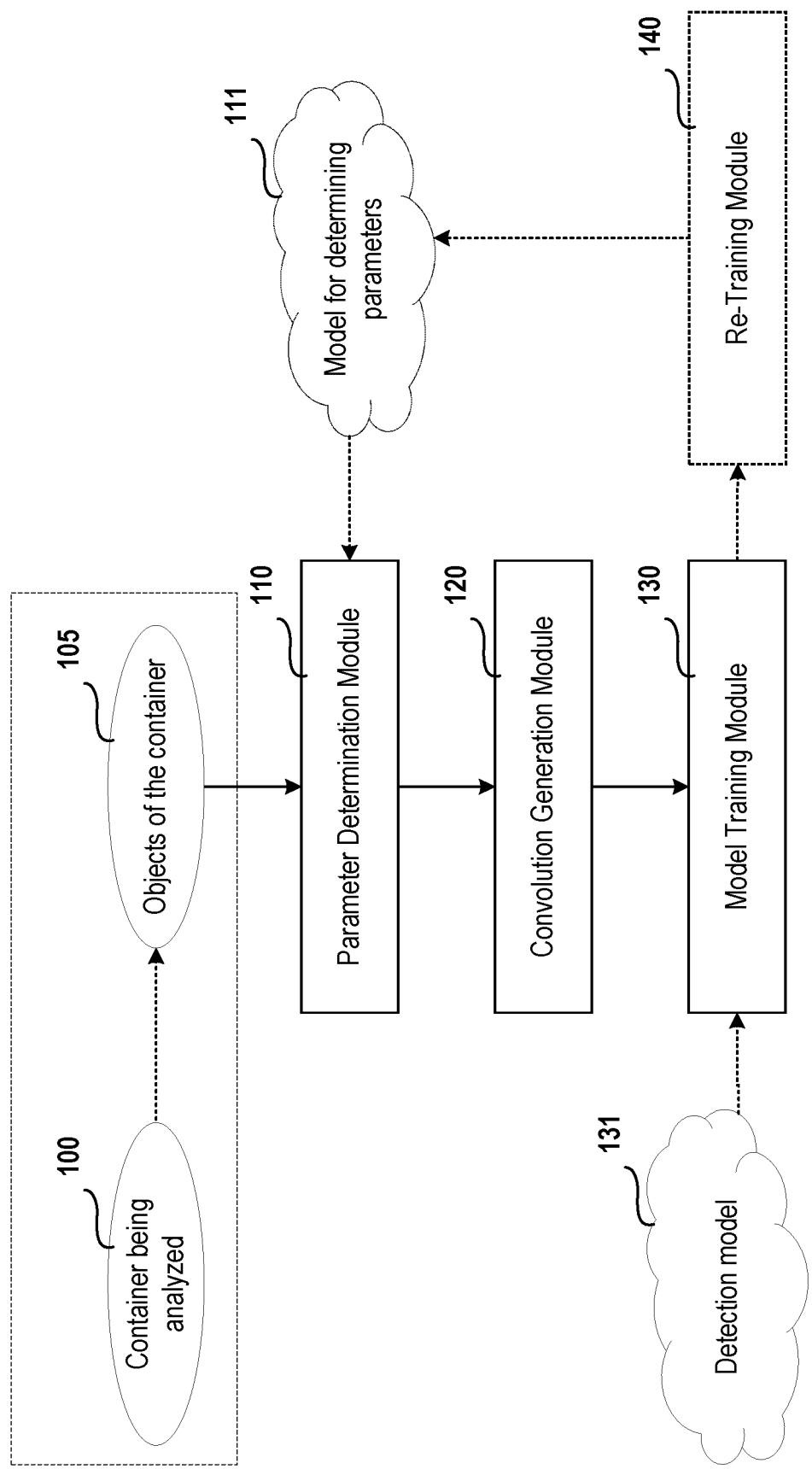
FIG. 1 shows a structural diagram of the system of teaching a model for detection of malicious containers.

Exemplary aspects are described herein in the context of a system, method, and computer program product for training machine learning models for detecting malicious container files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

We shall introduce a number of definitions and terms that will be used to describe exemplary aspects of the present disclosure.

Vector—is an abstract data type constituting an ordered set of values, in which a certain value may be encountered more than once, and all the values may be either of the same type or of different type. Instances of the values found in a vector are known as the elements (components) of the vector.

Container—is a type of file which may encapsulate in itself objects of other types. Containers, unlike collections, realize a particular data structure.

Machine learning (ML)—is a class of methods of artificial intelligence, the characteristic trait of which is not direct problem solving, but a teaching in the course of applying solutions from a group of similar problems. Such methods are constructed by the use of a means of mathematical statistics, numerical methods, optimization methods, the theory of probability, graph theory, and various techniques for working with data in digital form.

Unsupervised learning (self-learning, spontaneous learning)—is one of the methods of machine learning in which a system being tested is spontaneously taught to perform a stated task without intervention on the part of the experimenter. From the standpoint of cybernetics, it is one of the kinds of cybernetic experiment. As a rule, it is suitable only for problems in which descriptions are known for the set of objects (the training selection) and it is required to discover the internal links, dependencies and laws existing among the objects.

Supervised learning—is one of the methods of machine learning in which a system being tested is forced to learn with the aid of "stimulus/response" examples. From the standpoint of cybernetics, it is one of the kinds of cybernetic experiment. A certain dependency may exist between the inputs and the standard outputs (stimulus/response), but it is unknown. Only a finite group of precedents is known—the "stimulus/response" pair known as the training selection. On the basis of this data, it is required to reconstruct the dependency (construct a model of stimulus/response relations suitable for forecasting), that is, to construct an algorithm able to put out a sufficiently accurate response for any given object. A quality functional may be introduced to measure the accuracy of the responses, as in the case of teaching based on examples.

Functional relation—is a type of relation (link) between objects whereby changes in each of the objects accompany each other. In a functional relation, the primary features of a cause and effect relation are lacking: productiveness (the objects do not produce one another), asymmetry in time (they coexist, one of them does not precede another), and irreversibility.

Aspects of the present disclosure are configured to teach a model for detection of malicious files. The technical result of the present disclosure is the realization of its purpose. Yet another technical result of the present disclosure is to increase the detection of malicious files when using a model for detection of malicious files by virtue of its retraining on previously detected malicious files. This technical result is an improvement in computer functionality, namely, in antivirus technologies, over traditional static and dynamic virus scanning, which fails to recognize dangers in container files. For example, traditional static virus scanning is unable to guarantee a high degree of verification, when the content of a container file was analyzed as it was (i.e., by comparing masks), due to the possibility of encryption of container objects. Meanwhile, traditional dynamic virus scanning would require each container object to be started (for example, in a virtual environment) and its behavior to be analyzed, which is very resource-intensive and slow. In contrast, aspects of the present disclosure provide a system that analyzes the container file in a manner that solves both problems, i.e., a rapid analysis with a reliable verification of maliciousness (or not).

These results are accomplished with the use of a method of teaching a model for detection of malicious containers, wherein the container is a file containing at least two or more objects constituting logically separate data regions of the mentioned container (hereinafter, objects), wherein the method involves steps which are carried out by means of resources from a system of teaching a model for detection of malicious containers and in which a means of determination of parameters is used to determine the parameters of each object chosen from at least one safe container and one malicious container, uniquely characterizing the functional relation of the mentioned object to at least one selected object; a means of forming a convolution is used to form the convolutions separately for each container on the basis of the determined parameters of the objects chosen from the mentioned container, the convolution being a multidimensional vector, each element of which corresponds to its own unique parameter among the determined parameters, while the value of the mentioned element corresponds to the number of objects for which the mentioned parameter has been determined; a teaching means is used to carry out a machine teaching of the model for detection of malicious containers on the basis of the convolutions so formed, wherein the aforementioned model for detection is an algorithm for computing the degree of harmfulness of the container, while the degree of harmfulness of the container is a numerical value characterizing the probability that the mentioned container is malicious.

In another particular aspect of the method, the model for detection of malicious containers is further retrained in the event that the computed degree of harmfulness of the container lies within a previously determined range of threshold values such that the degree of harmfulness as computed on the basis of the parameters of the objects selected with the aid of the retrained model for determining parameters is greater than the degree of harmfulness computed on the basis of the parameters of the objects selected with the aid of the non-retrained model for detection of malicious containers.

In yet another particular aspect of the method, the container is at least: a PDF document; a distro; a file archive.

In another particular aspect of the method, the object selected from the container is at least: an executable file; a script; media data; and a container.

In yet another particular aspect of the method, the parameters of the object are at least: the type of object; the size of the object; the index of the object among all the objects contained in the container.

FIG. 1 shows an example of the structural diagram of the system of teaching a model for detection of malicious containers. The system for teaching a model for detection of malicious containers includes a container 100 being analyzed, objects of the container 105, parameter determination module 110, a model for determining parameters 111, convolution generation module 120, model training module 130, a detection model 131, and a retraining module 140 configured to retraining of the model for determining parameters.

In one aspect, the container 100 is a file containing at least two objects 105, which are logically separate data regions of the given container 100 (hereinafter, objects). The container 100 may be any file, package, or other data object that is configured and formatted to encapsulate multiple, logically separate data regions (which themselves may be files or other containers). In other words, the container 100 can be any given structured set of data from which it is technically possible to single out logically separate data regions as independent objects 105 on the basis of information about the aforementioned structure.

For example, the container 100 may be a PDF (Portable Document Format) document encapsulating objects that provide a complete description of a fixed-layout flat document, such as text, fonts, vector graphics, raster images, and other display information, as well as other logical structuring information, interactive elements (e.g., annotations, form fields), layers, video content, file attachments, metadata, and/or security-related objects (e.g., encryption keys, digital signatures). In another example, the container 100 may be an application containing SWF files (Flash application) or directly an SWF file itself. In yet other examples, a container 100 may be a Java applet; a software distro (such as a Windows installer formatted as a Microsoft Installer or "MSI") containing objects that are logically separate software components; or a file archive (such as a collection of files packaged by the WinZip archiver), where the objects 105 are files contained in the archive.

In some aspects, a container 100 may be an electronic document (such as a Microsoft Office® document), formatted in a binary word format having multiple objects (i.e., "storages") as an OLE Compound File, or in XML-based file format having multiple objects stored in binary encoded blocks within the XML. For example, a Microsoft Excel electronic document "quarterly_report.xlsx" 100 may contain text data (such as descriptive formulas of the functional relation of the cells of the Microsoft Excel table with each other), images or OLE attachments (graphs constructed on the basis of data from the tables of said electronic document), and also other Microsoft Excel electronic documents.

In yet another exemplary aspect of the system, the object 105 singled out from the container 100 is at least an executable file (including the library DLL); a script (for example, one written in the JavaScript language, ActionScript and so forth); media data (such as images, video, audio and so forth); another container file (such as a file archive embedded in another file archive); binary data; and text.

For example, a container 100 that is a file archive "archive.zip" may contain the executable file "viewer.exe" and the image "family.jpg", while the mentioned executable file "viewer.exe" is likewise a container 100, since there is a known structure for it (the structure of PE files), which describes the file sections, and the resource section contains the image "me.tiff".

In other words, the object 105 may be data whose modification (including replacement and removal from the container 100) can be done without changing the functional or the structure of the container 100 in which said data are stored, i.e., a modification of said objects 105 may be done without modification of other objects 105 contained in that container 100.

Figure 3:
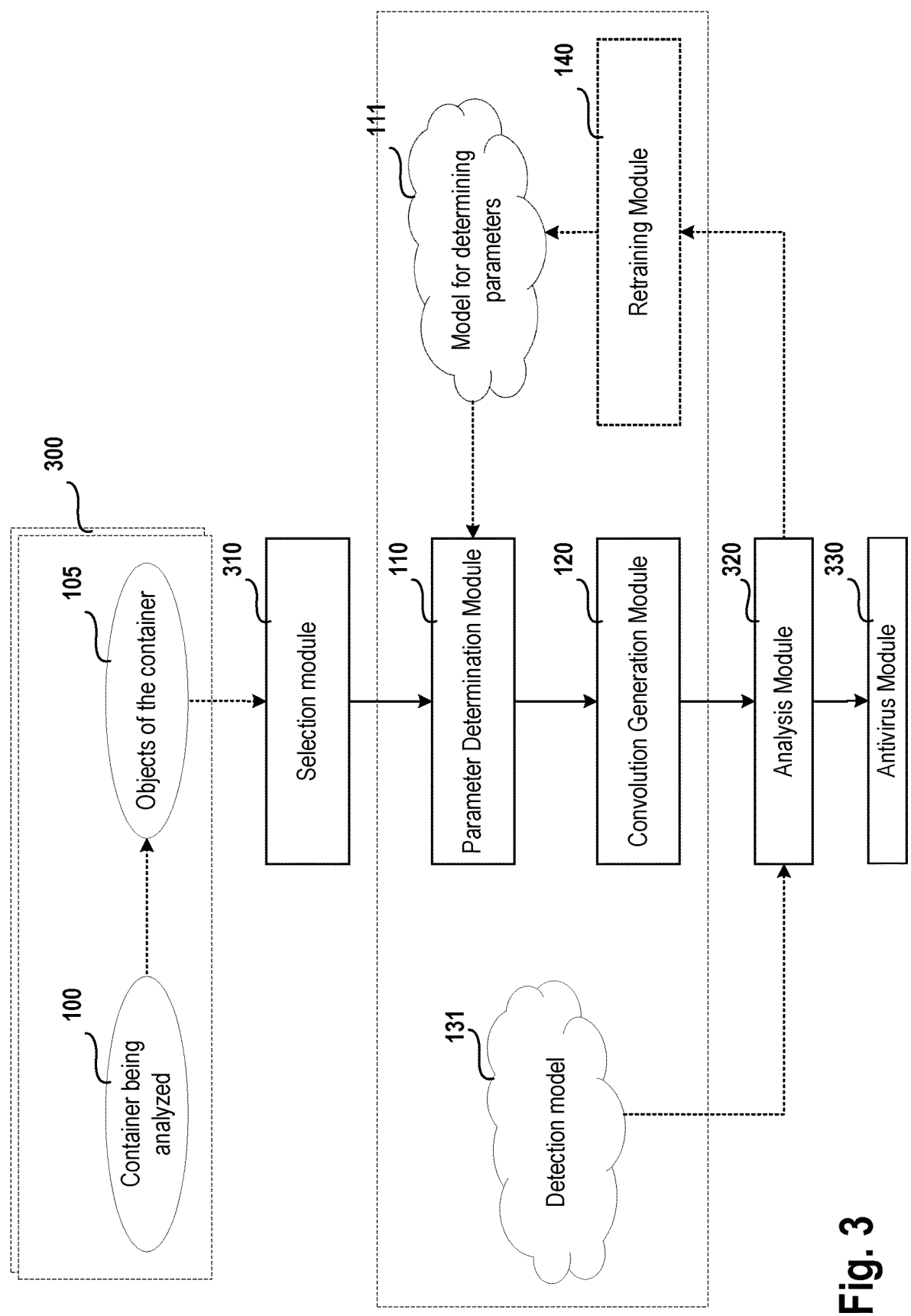
FIG. 3 shows a structural diagram of a system for scheduling of antivirus scan tasks.

The described system may select for analysis one of the objects 105 from the container 100, using a variety of techniques, and is described in greater detail in conjunction with FIG. 3.

The parameter determination module 110 is configured to determine the parameters of the objects 105 selected from the container being analyzed 100, and to transfer the determined parameters to the convolution generation module 120, at least one of the parameters characterizing the functional relation of the selected objects 105 with each other.

In one exemplary aspect of the system, the parameters of the object 105 include a parameter indicating the type of object 105 (for example, an image, text, media data, container, etc.); a parameter indicating the size of the object 105; a parameter indicating the total size of the selected objects 105 of the determined type (for example, the total size of the images is 1020 kb, the total size of the text data is 12 kb, and so forth); and an index of the object 105 among all the objects 105 contained in the container 100. In addition, the parameters are at least: the type of container 100 (for example, a zip archive, an SWF file, etc.); the size of the container 100; the number of selected objects 105 in the container; and the total size of all selected objects 105.

For example, the container "quarterly_report.xlsx" 100 may contain images "chart_01.jpg", "chart_02.jpg" and a VBScript "viewer.vbs". The parameters of the objects 105 of the container 100 may be those presented in the Tables 1.1 and 1.2 below:

TABLE 1.1

| parameter | "chart_01.jpg" | "chart_02.jpg" | "viewer.vbs" |
|---|---|---|---|
| type | Image | image | script |
| size | 15 kb | 78 kb | 2 kb |
| index | 1 | 2 | 3 |

TABLE 1.2

| parameter | summary statistics on objects of same type | |
|---|---|---|
| type | image | Script |
| total size | 93 kb | 2 kb |
| number of objects | 2 | 1 |

From the ratio of the size of the container 100 to the total of the sizes of the objects 105 of that container 100 there is furthermore determined the degree of unpacking of said container 100. The degree of unpacking of the container may be a numerical quantity that characterizes: (i) how many objects 105 out of those stored in the container 100 have been selected, including how many objects of a determined type 105 (including in dependence on the type of the container 100); and (ii) the total size of the selected objects 105 in relation to the size of the container 100 containing those objects (in other words, how many of the objects 105 contained in the container 100 were effectively extracted from it). In the event that the computed degree of unpacking of the container is less than a previously given threshold value, a decision is made that the unpacking of that container 100 is incomplete, and therefore said container 100 will be at least processed by other algorithms for selecting the objects 105; and/or sent on for additional analysis to be done by any method known in the art.

In yet another exemplary aspect of the system for determining the parameters of the objects 105 selected from the container 100, a trained model for determining parameters 111 is used, wherein said model for determining parameters 111 constitutes a set of rules for determining the parameters of the objects 105 so that each determined parameter increases the probability of classifying the analyzed container as malicious (i.e., parameters which cannot affect the harmfulness of the analyzed object or which decrease its harmfulness are not considered).

The parameters for a container object can be divided into two large groups, i.e., a first group of parameters on the basis of which it is possible to calculate the degree of harmfulness of a container or an object, and a second group of parameters on the basis of which it is unable to calculate the harmfulness of a container or object. The described system may refrain some determined parameters from use in training the machine learning model(s). That is, such parameters from the first group will not be considered (which compasses computing resources), i.e., if a certain parameter X is not a parameter from the first group, then it is ignored in further analysis. For example, a certain parameter X is not a parameter describing directly (for example, a hash sum from a black list) or indirectly (for example, the mask for a malicious IP address) the data of a malicious object 105—that parameter will be definitely ignored by the trained model for determining parameters 111 and the object 105 which it describes will not be extracted from the container 100. Another parameter Y indirectly describes the data of a malicious object 105, and therefore depending on the value of other parameters the object 105 may be extracted with a certain probability from the container 100. Furthermore the parameter Z directly describes the data of a malicious object 105, so that this object 105 will definitely be extracted from the container 100. A properly trained model for determining parameters 111 extracts only those objects 105 from the container 100 that can be characterized by parameters describing malicious objects 105 and consequently which influence the degree of harmfulness of the container 100.

The convolution generation module 120 is configured to generate or form a convolution (the values of a convolution algorithm) on the basis of the parameters of the objects 105 determined by the parameter determination module 110, being a multidimensional vector, each element of which corresponds to its own parameter from the group of determined parameters, while the value of that element corresponds to the number of objects 105 for which that parameter was determined, and to transfer the convolution so formed to the model training module 130.

The algorithm for forming the convolution may be expressed mathematically as:

$$c = \sum_{i}^{n_p} e_i \times N(p_i)$$

where
  c—is the convolution so formed;
  $e_i$—is the base for the i-th parameter;
  $p_i$—is the i-th parameter;
  $n_p$—is the number of parameters determined for the objects 105;
  $N(p_i)$—is the number of objects 105 for which the i-th parameter has been determined.

For example, from the parameters presented in Table 1.2 there will be formed the convolution:

$$c=[2,95232,1,2048],$$

where c is a vector of which every element depends on one determined parameter:
  c[0]—is the number of images selected from the container 100 (i.e., 2 images);
  c[1]—is the total size of all images selected from the container 100 (i.e., 95232 bytes);
  c[2]—is the number of scripts selected from the container 100 (i.e., 1 script);
  c[3]—is the total size of all scripts selected from the container 100 (i.e., 2048 bytes).

In one exemplary aspect of the system, the parameters of the objects 105 used to form the convolution may be the values of the functions of the determined parameters of the objects 105:

$$p_j = f(p_i)$$

i.e., the convolution may be expressed mathematically as:

$$c = \sum_{j}^{n_f} e_j \times N(f_j(\{p_i\}))$$

where
  c—is the convolution so formed;
  $e_j$—is the base for the j-th processing function of the parameters;
  $\{p_i\}$—is the group of parameters;
  $n_f$—is the number of specified processing functions $f(p_i)$ of the parameters determined for the objects 105;
  $f_j(\{p_i\})$—is the j-th processing function of the parameters determined for the objects 105;
  $N(f_j)$—is the number of objects 105 for which the value of the j-th function was determined.

For example, if the parameter is the size of the object 105, while the size of the object 105 may lie in the range [0x00000000, 0xFFFFFFFF], then the vector constituting the convolution being formed in one exemplary aspect may contain at least (4294967296+1) elements (1 to save the total size of the objects 105 and 4294967296 to save the number of objects 105 of the specified size). Such a representation of the information about the container 100 and its objects 105 is superfluous and resource-hungry, and therefore instead of the size of the object 105 it is possible to use the value of a function of the size of the object 105 $f(p_i)$. For example, if the function is the binary logarithm $f=\log_2$, then instead of 4294967296 elements of the vector to save the number of objects 105 of a given size, only 32 elements of the vector are needed ($2^{32}$=4294967296).

In yet another exemplary aspect of the system, the function $f(\{p_i\})$ may be a mathematical model, including an object containing conditional constructions.

For example, if the parameter is the size of the object 105, while the size of the object 105 may lie in the range [0x00000000, 0xFFFFFFFF], the parameter of the object 105 may be an index in a predetermined range [0, max] (where max is a predetermined value greater than 0, selected from considerations as to the size of the vector, the processing speed of the vector, and so forth), calculated with the aid of a function of the size of the object 105 $f(p_i)$:

$$f(p) = \begin{cases} 0, p \in [0x00000000, 0x00001000) \\ 1, p \in [0x00001000, 0x000F0000) \\ 2, p \in [0x000F0000, 0x00AC0000) \\ 3, p \in [0x00AC0000, 0xF0000000) \\ 4, p \in [0xF0000000, 0xFFFFFFFF] \end{cases}$$

Thus, instead of 4294967296 vector elements for the saving of the number of objects 105 of a given size, only 5 vector elements are needed. In the same way, any discrete parameter may be mapped by a discrete transformation onto another space of discrete parameters.

In yet another exemplary aspect of the system, the parameters of the above-described discrete transformation may be chosen on the basis of a previously performed analysis of the containers 100 such that the amount of information in the formulated convolution is a maximum for a predetermined size of the convolution. For example, if the parameter is the size of the object 105, and the size of the object 105 may lie in the range [0x00000000, 0xFFFFFFFF], then the parameter of the object 105 may be an index in a predetermined range [0, max], calculated with the aid of a function of the size of the object 105 index=ƒ($p$,{limits}), where
ƒ—is a function for the discrete transformation of a continuous parameter p into a discrete parameter index;
index—is the discrete parameter;
p—is the continuous parameter;
{limits}—is a set of parameters, expressed in the form of pairs {min, max} and describing the relation of the continuous parameter p to the discrete parameter index.

The parameters {min, max} are chosen such that the distribution of sizes of the objects 105 is uniform (with $(max_i - min_i) = const$, the distribution is linear; with $(max_i - min_i) = e^{f(i)}$ it is a normal distribution).

The model training module 130 is configured for machine learning of the model for detection of malicious containers 131 on the basis of at least one convolution, formed for a (predetermined) safe container, and one convolution formed for a (predetermined) malicious container, said detection model 131 being an algorithm for calculating the degree of harmfulness of a container 100, while the degree of harmfulness of a container 100 is a numerical value characterizing the probability that said container 100 is malicious. For example, the degree of harmfulness may be a real numerical value in the range of 0.0 to 1.0, where the value 0.0 means that the container being analyzed is guaranteed safe, and 1.0 that it is definitely malicious (i.e., malicious activity will occur if it is used on a computer). In yet another example, a sigmoid function is used for a binary classification of the harmfulness of containers being analyzed.

In one exemplary aspect of the system, the model training module 130 is additionally configured to retrain the model for detection of malicious containers 131 in the event that the calculated degree of harmfulness of the container 100 is in a predetermined range of threshold values, such that the degree of harmfulness as calculated with the retrained model for detection of malicious containers 131 is higher than the degree of harmfulness as calculated with the non-retrained model for detection of malicious containers 131.

For example, if the degree of harmfulness of the container is in the range [0.80 . . . 0.85] (for example, 0.805), while a container 100 is deemed to be malicious starting with a threshold value of 0.82, the model for detection of malicious containers 131 is retrained such that the degree of harmfulness as calculated with the aid of the retrained model for detection of malicious containers 131 is greater than the mentioned value of 0.805 (such as 0.815).

In yet another example, the retraining of the model for detection of malicious containers 131 is done whenever the calculated degree of harmfulness of the container 100 is greater than a predetermined threshold value. For example, if the degree of harmfulness of the container 100 is equal to 0.2, the degree calculated with the aid of the retrained model for detection of malicious containers 131 is greater than said value of 0.2 (such as 0.21), and if the degree of harmfulness of the container 100 is equal to 0.95, the degree calculated with the aid of the retrained model for detection of malicious containers 131 is greater than said value of 0.95 (such as 0.99). That is, the closer the degree of harmfulness of the container 100 to 1.0, the more effectively is the model for detection of malicious containers 131 retrained.

The retraining module 140 is configured to retrain the model for determining parameters 111 in a predetermined range of threshold values, so that the degree of harmfulness calculated on the basis of the parameters of the objects 105 selected with the aid of the retrained model for determining parameters 111 is higher than the degree of harmfulness as calculated on the basis of the parameters of the objects 105 selected with the aid of the non-retrained model for determining parameters 111.

In yet another exemplary aspect of the system, the retraining module 140 may be configured to: retrain the model for determining parameters 111, add at least one container 100 to the teaching selection of the model for determining parameters 111, and remove from the teaching selection of the model for determining parameters 111 at least one container.

In yet another exemplary aspect, the retraining of the model for determining parameters 111 uses at least the methods of machine learning: supervised learning (such as an artificial neural net, the error correcting method, the method of back propagation of mistakes, the method of reference vectors, and so forth); and unsupervised learning (such as the alpha reinforcement system, the gamma reinforcement system, the method of closest neighbors, and so forth).

Figure 2:
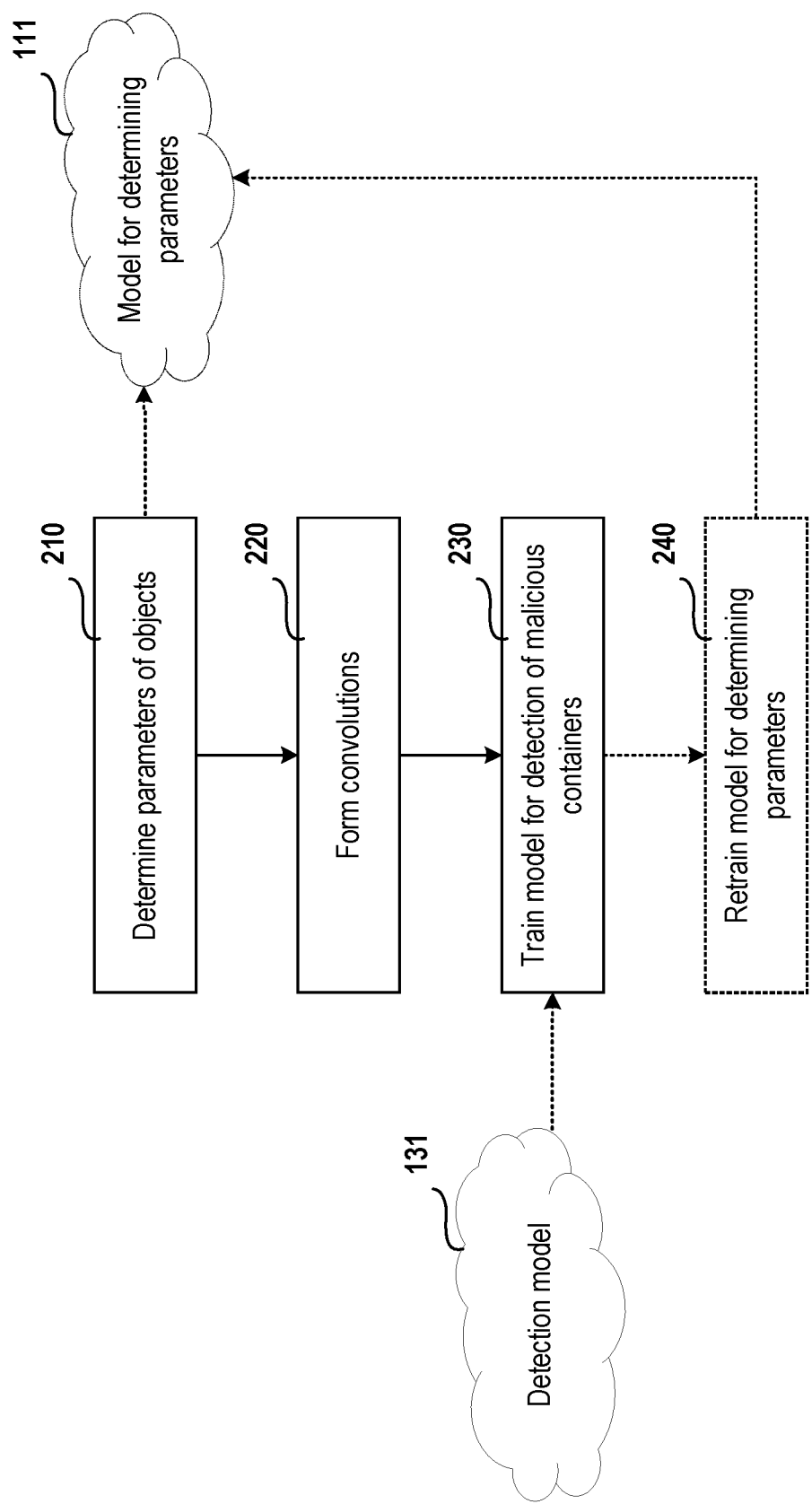
FIG. 2 shows a structural diagram of the method of teaching a model for detection of malicious containers.

FIG. 2 shows an example of a structural diagram of the method of teaching a model for detection of malicious containers. The structural diagram of the method of teaching a model for detection of malicious containers includes the step 210 in which the parameters of the objects are determined, step 220 in which the convolutions are formed, step 230 in which the model for detection of malicious containers is taught, and step 240 in which the model for determining parameters is retrained.

In step 210 the parameter determination module 110 is used to determine the parameters of objects 105 selected from at least one safe container and one malicious container, uniquely characterizing the functional relation between said object and at least one selected object (e.g., in the same container file). In some aspects, the safe container and the malicious container may even be sub-containers within another container, and are analyzed individually and independently.

In one exemplary aspect the containers 100 are selected from a group of containers constituting at least: a training selection containing safe and malicious containers 100; or a group of containers configured to perform an antivirus scan (determination of harmfulness of said containers 100), the classifying of said containers 100 as safe or malicious not being known in advance. For example, the training selection of the containers may be prepared by analysts for the purpose of training the model for determining parameters 111 or the detection model 131. In yet another example, the group of containers configured to perform the antivirus scan may be formed on the basis of gathered information with the aid of other means (for example, from users, from sites, with the aid of a crawler).

In step 220 the convolution generation module 120 is used to form convolutions separately for each container 100 on the basis of the determined parameters of objects 105 selected from said container 100. The convolution may be represented as a multidimensional vector, each element of which corresponds to its own unique parameter from the determined parameters, while the value of that element corresponds to the number of objects 105 for which that parameter was determined.

In step 230 the model training module 130 is used to perform machine learning for the model for detection of malicious containers 131 on the basis of the formed convolutions, said detection model 131 being an algorithm for calculating the degree of harmfulness of the container 100, while the degree of harmfulness of the container 100 is a numerical value characterizing the probability that said container 100 is malicious.

In step 240 the retraining module 140 is used to retrain the model for determining parameters 111 in the event that the calculated degree of harmfulness of the container 100 is greater than a predetermined threshold value such that the degree of harmfulness as calculated on the basis of the parameters of the objects 105 selected with the aid of the retrained model for determining parameters 111 is greater than the degree of harmfulness as calculated on the basis of the parameters of the objects 105 selected with the aid of the non-retrained model for determining parameters 111.

FIG. 3 shows an example of the structural diagram of a system for scheduling of antivirus scan tasks. The structural diagram of the system for scheduling of antivirus scan tasks includes a group of containers 300, the container being analyzed 100, the objects of the container 105, a selection module 310, the parameter determination module 110, the model for determining parameters 111, the convolution generation module 120, the detection model 131, the module 140 for retraining the model for determining parameters, an analysis module 320, and an antivirus module 330 configured to schedule antivirus scan tasks.

The purpose and layout of the container being analyzed 100, at least one object of the container 105, the parameter determination module 110, the model for determining parameters 111, the convolution generation module 120, the detection model 131 and the retraining module 140 have been described in detail above in FIG. 1, FIG. 2.

The group of containers 300 contains at least two containers. The diagram described in FIG. 3 solves the problem of the distribution of computing resources for the analysis of harmfulness of containers from a group of containers 300.

The selection module 310 is configured to select at least one object of a container 105 from a container being analyzed 100 and to send the selected objects 105 to the parameter determination module 110. In one exemplary aspect of the system, the selection of an object of a container 105 from a container being analyzed 100 is done on the basis of information about the structure of that container 100 by any suitable known method. In yet another exemplary aspect of the system, the selection of objects 105 is done on the basis of predetermined selection rules, such as based on whether the size of the container is within a predetermined range of values; based on whether the container has a definite type; and based on whether the degree of harmfulness of the container is in a predetermined range of values.

Further analysis of a container 100 for harmfulness, given that the degree of harmfulness has already been calculated for said container 100, is required to increase the effectiveness of the antivirus scan, and to decrease the errors of the first and second kind. Furthermore, the above-described method of determining the degree of harmfulness has high speed, low demands on computing resources, yet does not have the highest effectiveness (detection rate). For example, dynamic analysis in a virtual environment, or "sandbox", of a PDF file shows that when opened it is possible for new files to be saved to disk—it is possible for a shell code to be executed when said PDF file is opened, so that said PDF file requires further checking.

The convolution generation module 120 is further configured to send the formulated convolution to the analysis module 320.

The analysis module 320 is configured to calculate the degree of harmfulness of the container being analyzed 100 on the basis of the convolution formed with the aid of the trained detection model 131 and to send the calculated degree of harmfulness to the antivirus module 330 for scheduling the antivirus scan tasks.

The antivirus module 330 is configured to determine the parameters of the antivirus scan for the container being analyzed 100, the parameters of the antivirus scan characterizing the resources of the computing system on which that antivirus scan will be performed that are to be allocated to perform the antivirus scan for that container 100 in a specified time. In one exemplary aspect, the parameters of the antivirus scan may include the order of performing the antivirus scan for the containers from the group of containers 300, and/or the computing resources allocated to performing the antivirus scan for each container from the group of containers 300. In some aspects, the parameters of the antivirus scan may further include the start and end time for performing the antivirus scan for each container from the group of containers 300; and/or the method of the antivirus scan for each container from the group of containers 300.

The goal in the scheduling of the antivirus scan tasks of containers for which the degrees of harmfulness have already been calculated is as follows: the advantage of the above-described method of determining the degree of harmfulness of a container is its high speed and low demands on computing resources. Thus, it is possible to correctly detect containers which are guaranteed clean (with very low degree of harmfulness) and guaranteed malicious (with very high degree of harmfulness). The remaining containers require further checking by slower, more resource-hungry, yet also more reliable means of checking as known in the art. Moreover, the more malicious a container might appear to be, the faster (i.e., sooner) it should be checked. This is the goal of the scheduling of the antivirus scan tasks. The above-described method coupled with the antivirus scan methods known in the art is able to reduce the errors of the first and second kind when performing the mentioned antivirus scan while increasing the overall speed in performing the antivirus scan and reducing the computing resources consumed.

For example, the higher the degree of harmfulness of the container being analyzed, the closer it will be placed to the start of the queue of containers for performance of the antivirus scan. The queue of containers for performance of the antivirus scan may itself be changed dynamically such that containers newly added to the queue with a higher degree of harmfulness will undergo the antivirus scan sooner than containers with a lower degree of harmfulness, even though the mentioned containers with a lower degree of harmfulness have been waiting longer. Thus, a dynamic queue of containers occurs, sorted by degree of harmfulness as obtained from other sources.

In yet another example, the start and end time for performance of the antivirus scan is calculated to be such that at least: (i) the antivirus scan of all the containers from the queue of containers for the antivirus scan will be completed within a time not exceeding a predetermined time; and/or (ii) the use of computing resources for the mentioned antivirus scan will not exceed predetermined objects.

In yet another exemplary aspect, some of the containers from the group of containers 300 may be excluded from the queue to perform the antivirus scan. For example, if the check sum calculated on the basis of a container (for example, MD5) is on a "white list" (a database of check sums calculated on the basis of safe containers), then that container is excluded from the queue to perform the antivirus scan and is considered to be safe. On the other hand, if that check sum appears on a "black list" (a database of check sums calculated on the basis of malicious containers), then that container is also excluded from the queue to perform the antivirus scan and is acknowledged as being malicious.

Figure 4:
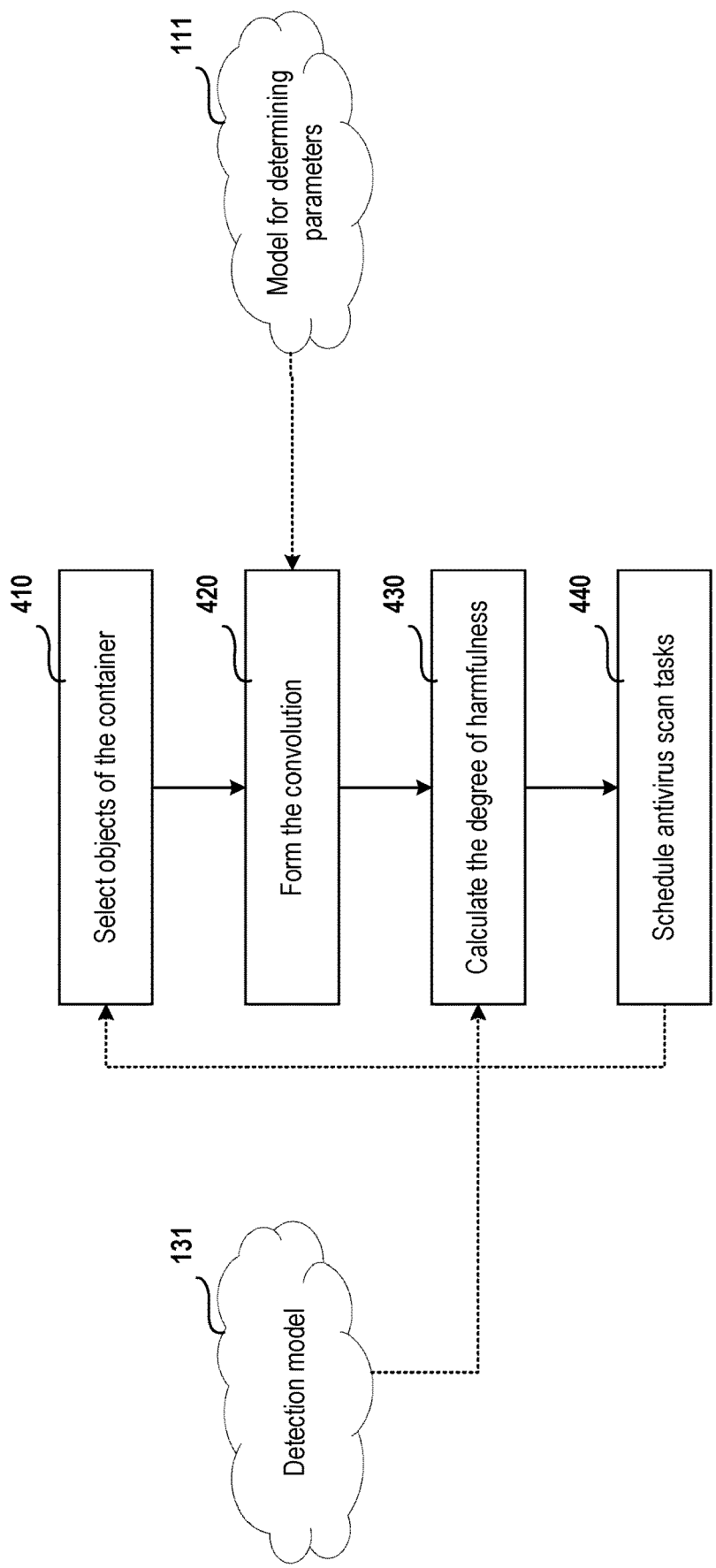
FIG. 4 shows a structural diagram of a method for scheduling of antivirus scan tasks.

FIG. 4 presents an example of the structural diagram of a method for scheduling of antivirus scan tasks. The structural diagram of the method for scheduling of antivirus scan tasks includes step 410 in which an object of a container is selected, step 420 in which the convolution is formed, step 430 in which the degree of harmfulness is calculated, and step 440 in which the antivirus scan tasks are scheduled.

In step 410 the selection module 310 is used to select at least one object of the container 105 from the container being analyzed 100.

In one exemplary aspect the containers 100 are selected from a group of containers constituting at least: a training selection containing safe and malicious containers 100; and/or a group of containers configured to perform an antivirus scan (determination of harmfulness of said containers 100), the classifying of said containers 100 as safe or malicious not being known in advance. For example, the training selection of containers may be prepared by analysts for the purpose of training the model for determining parameters 111 or the detection model 131.

In step 420 the convolution generation module 120 is used to form a convolution on the basis of the selected objects of the container 105. In some aspects, the convolution formed on the basis of the parameters of the objects 105 selected in step 410 is a multidimensional vector, each element of which corresponds to its own parameter from the group of determined parameters, while the value of that element corresponds to the number of objects 105 for which that parameter was determined, and the convolution so formed is transferred to the model training module 130.

The algorithm for forming the convolution may be expressed mathematically as:

$$c = \sum_{i}^{n_p} e_i \times N(p_i)$$

where
- c—is the convolution so formed;
- $e_i$—is the base for the i-th parameter;
- $p_i$—is the i-th parameter;
- $n_p$—is the number of parameters determined for the objects 105;
- $N(p_i)$—is the number of objects 105 for which the i-th parameter has been determined.

In step 430 the analysis module 320 is used to calculate the degree of harmfulness of the container being analyzed 100 on the basis of the convolution formed in step 420 with the aid of the trained detection model 131.

In step 440 the antivirus module 330 for scheduling antivirus scan tasks is used to determine, on the basis of the degree of harmfulness of the container 100 as computed in step 430, the parameters of the antivirus scan for the container being analyzed 100, the parameters of the antivirus scan characterizing the resources of the computing system on which that antivirus scan will be performed that are to be allocated to perform the antivirus scan for that container 100 in a specified time.

Figure 5:
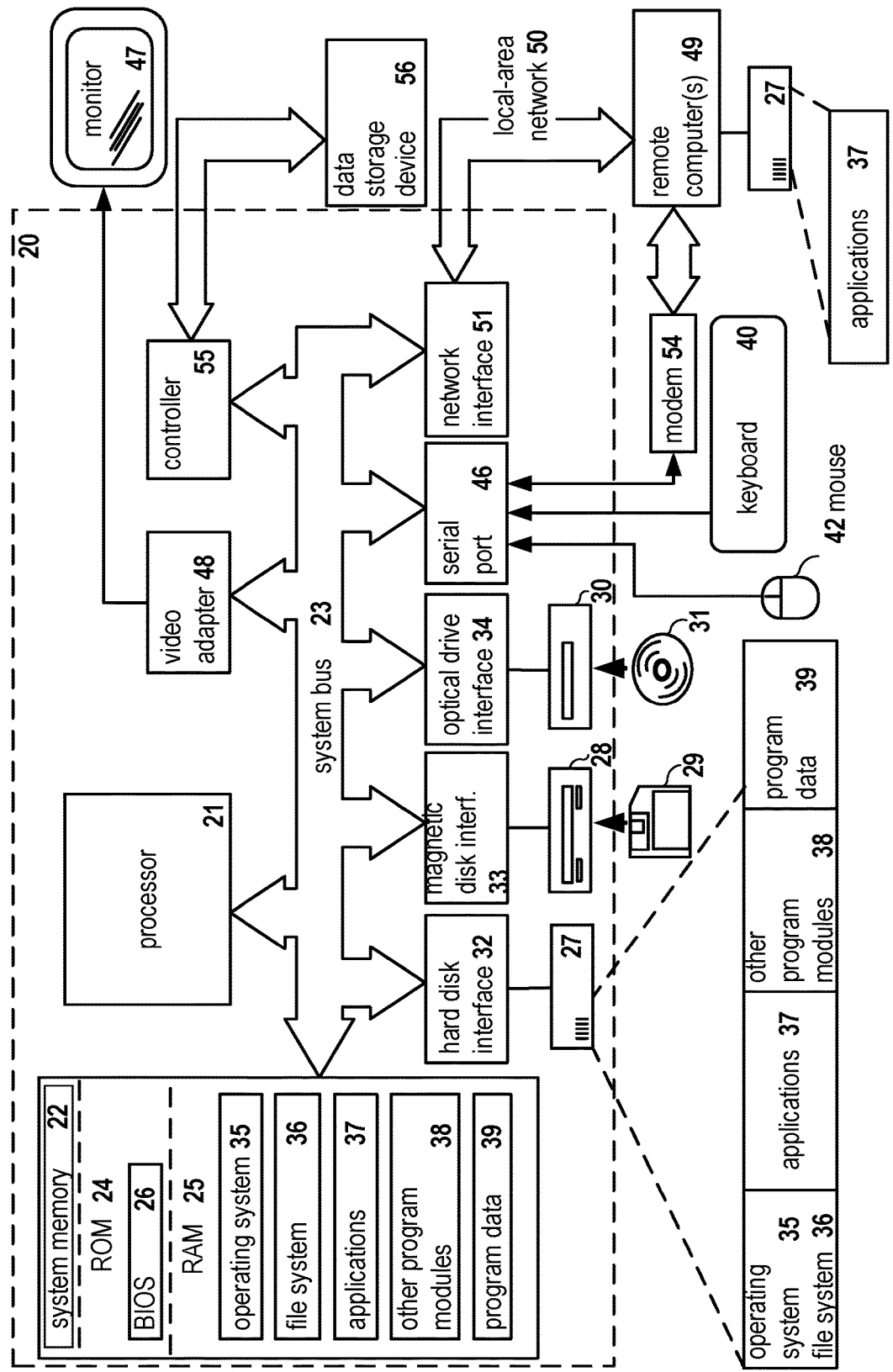
FIG. 5 shows an example of a general-purpose computer system, a personal computer or server.

FIG. 5 is a block diagram illustrating a computer system 20 on which aspects of systems and methods for training a machine learning model for detecting malicious container files may be implemented in accordance with an exemplary aspect. It should be noted that the computer system 20 can implement one of more of the modules shown in FIGS. 1-4, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for training a machine learning model for detecting malicious container files, comprising:
   selecting a plurality of objects from a malicious container file, wherein a container file is a file that contains at least two or more objects constituting logically separate data regions of the container file;
   determining at least one parameter for each object selected from the malicious container file, wherein the at least one parameter characterizes a functional relation of the respective object to at least one other object in the container file;
   generating a first convolution, associated with the malicious container file, based on the determined at least one parameter, wherein the first convolution comprises a multidimensional vector in which each element of the multidimensional vector corresponds to its own unique parameter among the determined parameters, while the value of the mentioned element corresponds to the number of objects for which the mentioned parameter has been determined;
   generating a second convolution, associated with a safe container file, based on determined parameters of objects that are chosen from the safe container file; and
   modifying the machine learning model based on the first convolution associated with the malicious container file and the second convolution associated with the safe container file, wherein the machine learning model is configured to compute a degree of harmfulness of a container file under analysis.

2. The method of claim 1, further comprising:
applying the machine learning model to a target container file to compute the degree of harmfulness of the target container file, wherein the computed degree of harmfulness of the target container file is a numerical value characterizing a probability that the target container file under analysis is malicious.

3. The method of claim 2, further comprising:
responsive to determining the computed degree of harmfulness is in a predetermined range of threshold values, retraining the machine learning model such that the degree of harmfulness as calculated with the retrained model is higher than the degree of harmfulness as calculated with the original machine learning model.

4. The method of claim 2, further comprising:
scheduling an antivirus application to perform an antivirus scan of the target container file based on the computed degree of harmfulness.

5. The method of claim 1, wherein the malicious container file is one of a PDF (Portable Document Format) document, a software distro, and a file archive.

6. The method of claim 1, wherein the object selected from the container file is at least one of an executable file, a script, media data, and another container file.

7. The method of claim 1, wherein the determined parameters of at least one selected object comprise at least one of a type of the selected object, a size of the selected object, and an index of the selected object among all the objects contained in the container file.

8. The method of claim 1, wherein the determining at least one parameter for each object selected from the malicious container file is performed using a second machine learning model, wherein the second machine learning model comprises a set of rules for determining the parameters of the objects such that each determined parameter increases a probability of classifying a target container file as malicious.

9. A system for training a machine learning model for detecting malicious container files, the system comprising:
a storage device configured to store a group of container files;
a hardware processor configured to:
select a plurality of objects from a malicious container file, wherein a container file is a file that contains at least two or more objects constituting logically separate data regions of the container file;
determine at least one parameter for each object selected from the malicious container file, wherein the at least one parameter characterizes a functional relation of the respective object to at least one other object in the container file;
generate a first convolution, associated with the malicious container file, based on the determined at least one parameter, wherein the first convolution comprises a multidimensional vector in which each element of the multidimensional vector corresponds to its own unique parameter among the determined parameters, while the value of the mentioned element corresponds to the number of objects for which the mentioned parameter has been determined;
generate a second convolution, associated with a safe container file, based on determined parameters of objects that are chosen from the safe container file; and
modify the machine learning model based on the first convolution associated with the malicious container file and the second convolution associated with the safe container file, wherein the machine learning model is configured to compute a degree of harmfulness of a container file under analysis.

10. The system of claim 9, wherein the processor is configured to:
apply the machine learning model to a target container file to compute the degree of harmfulness of the target container file, wherein the computed degree of harmfulness of the target container file is a numerical value characterizing a probability that the target container file under analysis is malicious.

11. The system of claim 10, wherein the processor is configured to:
responsive to determining the computed degree of harmfulness is in a predetermined range of threshold values, retrain the machine learning model such that the degree of harmfulness as calculated with the retrained model is higher than the degree of harmfulness as calculated with the original machine learning model.

12. The system of claim 10, wherein the processor is configured to:
schedule an antivirus application to perform an antivirus scan of the target container file based on the computed degree of harmfulness.

13. The system of claim 9, wherein the malicious container file is one of a PDF (Portable Document Format) document, a software distro, and a file archive.

14. The system of claim 9, wherein the object selected from the container file is at least one of an executable file, a script, media data, and another container file.

15. The system of claim 9, wherein the determined parameters of at least one selected object comprise at least one of a type of the selected object, a size of the selected object, and an index of the selected object among all the objects contained in the container file.

16. The system of claim 9, wherein the determination of at least one parameter for each object selected from the malicious container file is performed using a second machine learning model, wherein the second machine learning model comprises a set of rules for determining the parameters of the objects such that each determined parameter increases a probability of classifying a target container file as malicious.

17. A non-transitory computer readable medium comprising computer executable instructions for training a machine learning model for detecting malicious container files, including instructions for:
selecting a plurality of objects from a malicious container file, wherein a container file is a file that contains at least two or more objects constituting logically separate data regions of the container file;
determining at least one parameter for each object selected from the malicious container file, wherein the at least one parameter characterizes a functional relation of the respective object to at least one other object in the container file;
generating a first convolution, associated with the malicious container file, based on the determined at least one parameter, wherein the first convolution comprises a multidimensional vector in which each element of the multidimensional vector corresponds to its own unique parameter among the determined parameters, while the value of the mentioned element corresponds to the number of objects for which the mentioned parameter has been determined;
generating a second convolution, associated with a safe container file, based on determined parameters of objects that are chosen from the safe container file; and modifying the machine learning model based on the first convolution associated with the malicious container file and the second convolution associated with the safe container file, wherein the machine learning model is configured to compute a degree of harmfulness of a container file under analysis.

18. The non-transitory computer readable medium of claim 17, wherein the instructions further comprise instructions for:

applying the machine learning model to a target container file to compute the degree of harmfulness of the target container file, wherein the computed degree of harmfulness of the target container file is a numerical value characterizing a probability that the target container file under analysis is malicious.

19. The non-transitory computer readable medium of claim 18, wherein the instructions further comprise instructions for:

responsive to determining the computed degree of harmfulness is in a predetermined range of threshold values, retraining the machine learning model such that the degree of harmfulness as calculated with the retrained model is higher than the degree of harmfulness as calculated with the original machine learning model.

20. The non-transitory computer readable medium of claim 18, wherein the instructions further comprise instructions for:

scheduling an antivirus application to perform an antivirus scan of the target container file based on the computed degree of harmfulness.

* * * * *